US007016378B1

(12) United States Patent
Dasika et al.

(10) Patent No.: US 7,016,378 B1
(45) Date of Patent: Mar. 21, 2006

(54) METHOD AND SYSTEM FOR AUTOMATICALLY PROVISIONING AN OVERHEAD BYTE

(75) Inventors: Prasad Dasika, Odenton, MD (US); Thomas Angert, Roswell, GA (US); Michael Brown, Baltimore, MD (US)

(73) Assignee: CIENA Corporation, Linthicum, MD (US)

( * ) Notice: Subject to any disclaimer, the term of this patent is extended or adjusted under 35 U.S.C. 154(b) by 1028 days.

(21) Appl. No.: 09/770,366

(22) Filed: Jan. 26, 2001

(51) Int. Cl.

| | |
|---|---|
| ***G01R 31/08*** | (2006.01) |
| ***H04L 12/50*** | (2006.01) |
| ***H04J 14/00*** | (2006.01) |
| ***H04J 14/02*** | (2006.01) |
| ***H04B 10/20*** | (2006.01) |

(52) U.S. Cl. ...................... 370/535; 370/359; 370/222; 370/373; 398/45; 398/59; 398/83

(58) Field of Classification Search ................ 370/535, 370/395.51, 469, 503, 506, 536, 537, 539, 370/907, 400, 404, 395.1, 222, 352, 389, 370/419, 470, 395.5; 398/45, 43, 49, 59, 398/83

See application file for complete search history.

(56) References Cited

U.S. PATENT DOCUMENTS

| | | | | |
|---|---|---|---|---|
| 4,698,806 | A | 10/1987 | Graves et al. | 370/100 |
| 4,719,624 | A | 1/1988 | Bellisio | 370/100 |
| 4,987,570 | A | 1/1991 | Almond et al. | 370/84 |
| 5,210,745 | A | 5/1993 | Guinand et al. | 370/79 |
| 5,257,261 | A | 10/1993 | Parruck et al. | 370/84 |
| 5,278,689 | A | 1/1994 | Gitlin et al. | 359/137 |
| 5,291,485 | A | 3/1994 | Afify et al. | 370/77 |
| 5,539,914 | A | 7/1996 | Fry et al. | 395/827 |
| 5,579,323 | A | 11/1996 | Krisher | 370/99 |
| 5,617,233 | A | 4/1997 | Boncek | 359/123 |
| 5,666,351 | A | 9/1997 | Oksamen et al. | 370/474 |
| 5,841,760 | A | 11/1998 | Martin et al. | 370/242 |
| 6,011,802 | A | 1/2000 | Norman | 370/466 |
| 6,122,281 | A * | 9/2000 | Donovan et al. | 370/401 |
| 6,477,178 | B1 * | 11/2002 | Wakim et al. | 370/466 |
| 6,498,794 | B1 * | 12/2002 | Tsukamoto et al. | 370/395.1 |
| 6,636,529 | B1 * | 10/2003 | Goodman et al. | 370/469 |
| 6,704,326 | B1 * | 3/2004 | Russell et al. | 370/466 |
| 6,810,046 | B1 * | 10/2004 | Abbas et al. | 370/545 |
| 6,901,082 | B1 * | 5/2005 | Purse | 370/535 |

* cited by examiner

*Primary Examiner*—Hanh Nguyen
(74) *Attorney, Agent, or Firm*—Dougherty Clements; Christopher L Bernard; Tyler S. Brown

(57) ABSTRACT

An exemplary embodiment of the invention is a communications device for use in a communications network. The communications device includes a plurality of interface ports, each of the interface ports receiving a first signal in a first format. A processor is coupled to the interface ports and receives the first signals. The processor provisions an overhead byte associated with one of the first signals and multiplexes the first signals to generate a multiplexed signal. A framer receives the multiplexed signal and the provisioned overhead byte and places the multiplexed signal in a second format to provide a second signal for transmission on the communications network.

43 Claims, 7 Drawing Sheets

METHOD AND SYSTEM FOR AUTOMATICALLY PROVISIONING AN OVERHEAD BYTE

BACKGROUND OF THE INVENTION

1. Field of Invention

The invention relates generally to a method and system for automatically provisioning an overhead byte used in transmitting information in a communications network.

2. Description of Related Art

Within the evolving telecommunications industry, the advent of numerous independent, localized networks has created a need for reliable inter-network communication. Unfortunately, this inter-network communication is difficult to accomplish in a cost effective manner due to differences in the digital signal hierarchies, the encoding techniques and the multiplexing strategies. Transporting a signal to a different network often requires a multiplexing/demultiplexing, coding/decoding process to convert the signal from one scheme to another scheme. To address these difficulties, standards for network communications have been developed. One standard referred to as SONET, an acronym for Synchronous Optical NETwork, defines a set of standards for the rates and formats for optical networks. Proposed by Bellcore during the early 80s and standardized by ANSI, SONET is compatible with Synchronous Digital Hierarchy (SDH), a similar standard established in Europe by ITU-T.

FIG. 1 depicts a Synchronous Transport Signal (STS) frame that forms the basic building block of SONET optical interfaces, where an STS-1 (level 1) frame is the basic signal rate of SONET. Multiple STS-1 frames may be concatenated to form STS-N frames, where the individual STS-1 signals are byte interleaved. The STS-1 frame consists of 90 columns by 9 rows of bytes, the frame length is 125 microseconds. As such, the STS-1 frame has a rate of 51.840 Mb/s. The STS-1 frame shown in FIG. 1 depicts the byte allocation in the section overhead (SOH), line overhead (LOH) and path overhead (POH). The synchronous payload envelope (SPE) carries the information portion of the signal along with the POH. The various overhead bytes carry signaling and protocol information. This allows communication between intelligent nodes within the network, permitting administration, surveillance, provisioning and control of the network from a central location. The SDH standard is similar to the SONET standard and includes similar overhead bytes arranged in a synchronous transport module (STM).

Existing communications networks are continually under pressure to increase capacity by carrying increasingly higher data rates and also non-SONET, packet based signals. Due to the proliferation of non-SONET signals, it is important that bandwidth on an optical transmission system be utilized efficiently. Therefore, there is a need to multiplex non-SONET signals. One way to perform this multiplexing is to map the non-SONET format signals into SONET frames to exploit the advantages afforded by SONET. Since the non-SONET format signals (e.g., GbE) have a lower data rate than SONET frames, two or more signals can be multiplexed onto a single wavelength. In these cases it is advantageous to be able to direct the two multiplexed streams to different destinations. Accordingly, there is a need in the art for a system that automatically provides for directing multiplexed signals to different recipients in a communications network.

SUMMARY OF THE INVENTION

An exemplary embodiment of the invention is a communications device for use in a communications network. The communications device includes a plurality of interface ports, each of the interface ports receiving a first signal in a first format. A processor is coupled to the interface ports and receives the first signals. The processor provisions an overhead byte associated with one of the first signals and multiplexes two or more of the received first signals to generate a multiplexed signal. A framer receives the multiplexed signal and the provisioned overhead byte and places the multiplexed signal and provisioned overhead byte in a second format to provide a second signal for transmission on the communications network.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

The use of terms "transmission" and "reception" as used herein refer to any connection, coupling, link or the like by which signals, such as optical signals, carried by a "transmitting" system element are imparted to a "receiving" system element. Such "transmitters" and "receivers" are not necessarily directly connected to one another and may be separated by intermediate optical and/or electrical network components or devices.

Figure 2:
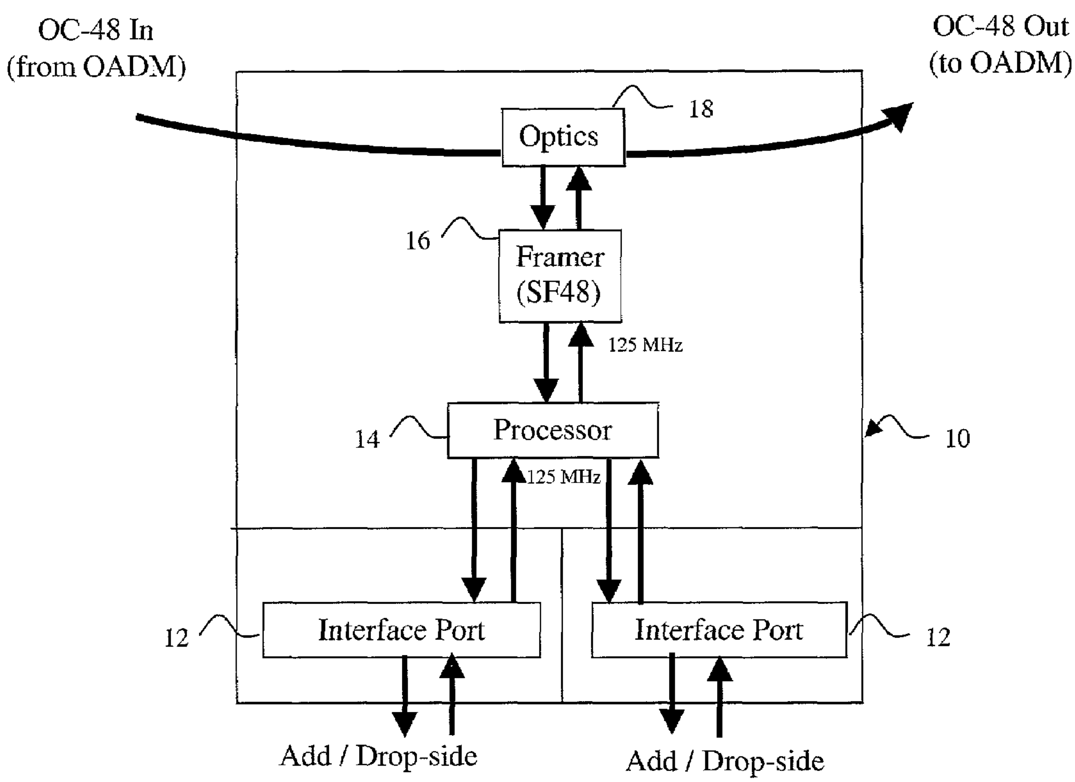
FIG. 2 is a block diagram of a communications device in an exemplary embodiment of the invention.

FIG. 2 is a block diagram of a communications device 10 in an exemplary embodiment of the invention. The communications device 10 is preferably a transceiver for sending and receiving information signals over a communications network. The invention may be embodied in a separate transmitter and receiver and is not limited to transceivers.

The communications device 10 shown in FIG. 2 is designed to receive two gigabit Ethernet (GbE) signals, multiplex the two GbE signals, and place the multiplexed GbE signals in a SONET frame. In an exemplary embodiment, the line rate on a GbE is 1.25 Gb/s, and thus two GbE signals are multiplexed to a SONET OC-48 signal having a line rate of approximately 2.5 Gb/s (after 8B/10B decoding on GbE). The OC-48 signal can then be transmitted on a single wavelength on the communications network. One advantage of this approach is that it saves wavelengths if used in conjunction with a (D)WDM or fibers in case of stacked applications, and provides cost saving to the customers.

The invention is not limited to placing GbE signals in a SONET/SDH frame. Any number of signals in a first format (e.g., Ethernet, ATM, ESCON, FDDI, etc.) can be multiplexed and placed in a second format (SONET, SDH, etc.). It is preferable, however, if the first signal format is a packetized format to facilitate placing the first signal in the second format.

During the transmission process, as described in detail herein, an overhead byte (preferably the J1 byte in the SONET or SDH standards) is automatically provisioned to contain information used in receiving the information signals.

The communications device 10 shown in FIG. 2 includes two interface ports 12 that serve as input/output ports for the signal in the first format. In a preferred embodiment, the first signal is an optical signal and the interface ports 12 convert the first signal from an optical signal to electrical signal for transmission, and from an electrical signal to an optical signal for reception. In the embodiment shown in FIG. 2, the first signal format is GbE and thus the interface ports 12 are gigabit Ethernet interface cards (GBIC). The incoming serial data, at the GbE line rate, is deserialized by the interface port 12 and passed on to processor 14 where the two GbE signals are multiplexed (e.g., time division multiplexed) to form a multiplexed signal. The data is also processed to obtain statistics such as utilization factor, CRC errors, etc. In an exemplary embodiment, the processor 14 is implemented using a field-programmable gate array (FPGA) and associated components such as a microprocessor, memory, etc. Processor 14 may be implemented using different technologies such as ASIC, PLA, CPLD, etc.

Figure 6:
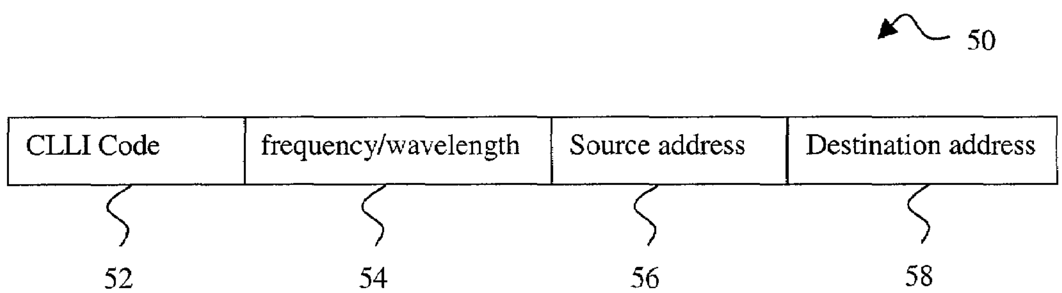
FIG. 6 depicts an exemplary provisioned overhead byte.

The processor 14 also automatically provisions an overhead byte for each of the first signals and submits the multiplexed signal and provisioned overhead bytes to a framer 16. During a provisioning phase, each of the GbE ports on the network are associated with each other to provide a clear communications link. This means that sources are identified with sinks so each source port knows which sink port is receiving the sent information. In a preferred embodiment, the J1 byte of a SONET frame is automatically provisioned based on the provisioning performed in the provisioning phase. When a particular GbE tributary is mapped onto an STS frame, then the J1 byte associated with the STS frame in question is automatically provisioned. Other bytes in other standards may be automatically provisioned. As shown in FIG. 6, the automatic provisioning includes provisioning the overhead byte 50 to contain a CLLI code 52, the frequency/wavelength 54 being used for transmission, the source address 56 and the destination address 58. The source address 56 and destination address 58 may be in IP format or other known addressing formats. The CLLI code 52 is a common language location identifier used to identify the type of equipment being used for communication.

The two multiplexed GbE signals are then loaded onto an OC-48 SONET frame using the framer 16. The framer 16 may use the provisioned overhead byte to determine where the multiplexed GbE signals are placed in the SONET frame. The OC-48 SONET frame containing the two packetized GbE streams is then loaded on to the communications network using conventional electro-optics 18 (e.g., long reach optics) in communications device 10. The electro-optics 18 convert the electrical signal from framer 16 into an optical signal which is then optically multiplexed on or demultiplexed off the optical communications network using an optical add/drop multiplexer (OADM).

Figure 7:
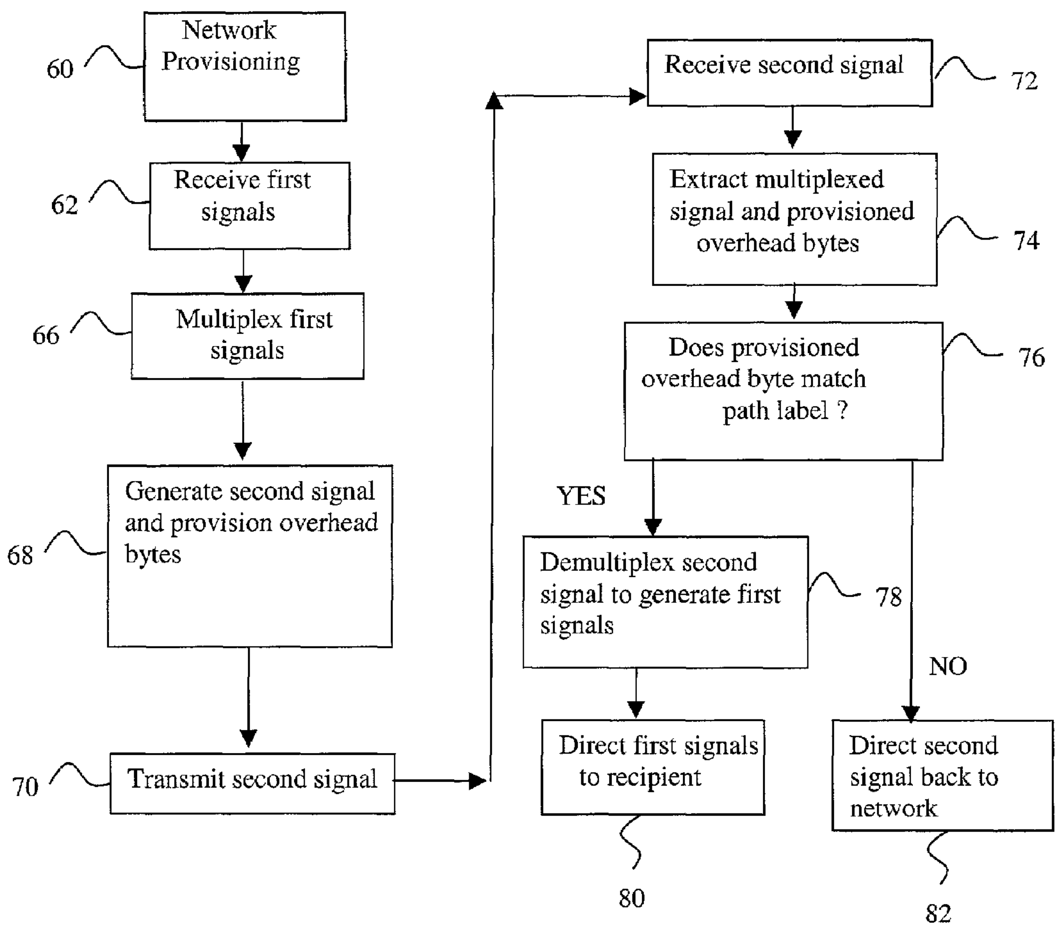
FIG. 7 is a flowchart of processing performed during transmission and reception.

FIG. 7 is a flowchart of the processing performed by the communications device 10 during transmission and reception. Prior to transmission, a provisioning process is performed at step 60. During a provisioning phase, network elements are configured to establish a communications path from one element to another. A communications device 10 transmitting a signal is provisioned with a path label including a source and destination address. An interface port 12 in a communication device 10 receiving this signal is also provisioned with a path label corresponding to the destination address.

Once the provisioning phase is complete, at step 62 the communications device 10 receives the first signals (e.g., GbE signals) at interface ports 12. The two first signals are then multiplexed at step 66 to generate the multiplexed signal. The multiplexed signal is then placed in the second format (e.g., SONET) and the overhead bytes (e.g., SONET J1 byte) are automatically provisioned to form the second signal as shown at step 68. The second signal is transmitted on the communications network at step 70.

During reception, the communications device 10 performs the reverse operation. The framer 16 receives the second signal (e.g., OC-48 signal) at step 72 and extracts the multiplexed signal and provisioned overhead bytes associated with each of the first signals making up the multiplexed signal at step 74. The framer 16 passes the multiplexed signal and provisioned overhead bytes to the processor 14. Integrity and error checking may be performed as is described in further detail with respect to FIG. 3. At step 76, processor 14 reads the provisioned overhead bytes and determines for each first signal whether the received provisioned overhead byte corresponds to the path label for which a particular GbE stream has been provisioned. If any provisioned overhead byte and the path label match, then second signal is demultiplexed at step 78. The appropriate first signals (i.e., first signals having a provisioned overhead byte matching the path label) are provided to the recipient at step 80 through interface port 12. If the path label does not match the provisioned overhead byte, then an alarm is raised. Signals having a provisioned overhead byte not matching the path label may be placed back on the communications network as shown at step 82.

By comparing the provisioned overhead byte to a path label, the communications device 10 enhances network security. In conventional communications network, signals directed to different recipients are often multiplexed on a common wavelength. This creates security concerns in that confidential information may be inadvertently directed to the wrong recipient due to wavelength sharing. As described above, the communications device 10 prevents unintended delivery of information by comparing the provisioned overhead byte to the path label.

Figure 3:
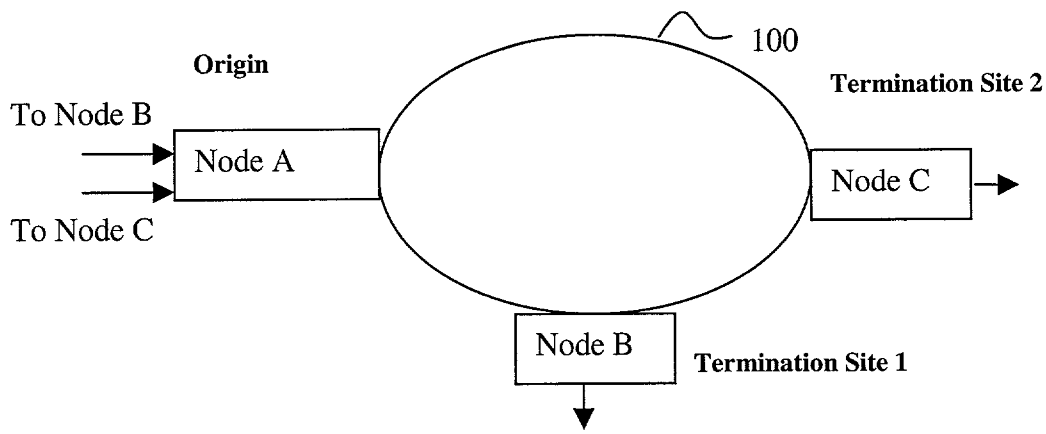
FIG. 3 depicts an exemplary communications network.

FIG. 3 depicts an exemplary application of communications device 10. Depicted in FIG. 3 is a communications network 100 including three nodes A, B and C. Each node includes a communications device 10 as described above with reference to FIG. 2. As shown in FIG. 3, node A receives two GbE signals, one intended for node B and one intended for node C. The two GbE signals are multiplexed into a single stream as described above. When the transmission from node A is received at node B, the processor 14 at node B compares the provisioned overhead byte with the path label assigned to Node B during the provisioning phase. For STS frames having a provisioned overhead byte matching the path label, data is downloaded from the SONET frame and restored to GbE format and passed onto the appropriate interface port 12. Thus, at Node B, only those signals that are designated for Node B are passed on to the interface port 12 at Node B. The signal that is destined to Node C continues on the communications network. Similarly at Node C, only that data which is destined to Node C is delivered. This protects information from being distributed to incorrect recipients.

In addition to the automatic provisioning, error detection and protection is performed for each multiplexed GbE stream individually. Upon receipt at node B, for example, the integrity of the data received from the communications network is analyzed using known SONET techniques such as B1, B2 and B3 error counts. The error count on the signal received from the communications network is used to decide whether or not to initiate a protection switch. Based on the number of STS frames allotted to a particular GbE stream/tributary, B3 errors are calculated and protection switching is initiated based on the B3 error counts. Thus, protection switching can be initiated on a per tributary/GbE channel basis. Each of the two GbE signals can be independently dropped or forwarded back on to the communications network for transport to a different node. Thus, even though the origin of each of the GbE streams is the same (i.e., node A), their termination point can be different.

Figure 1:
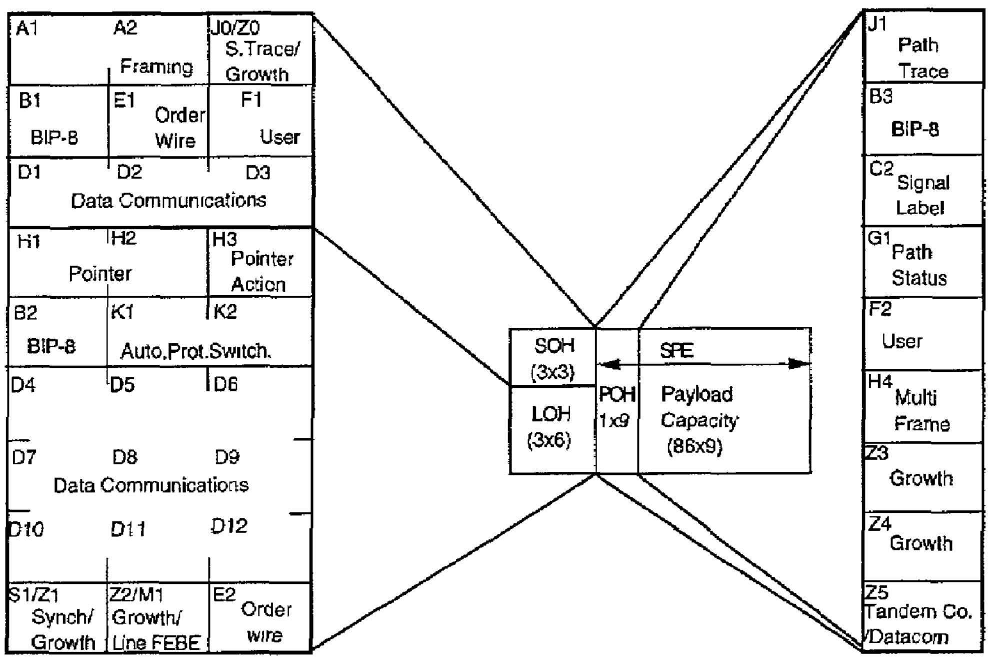
FIG. 1 depicts an STS-1 frame structure.
Figure 4:
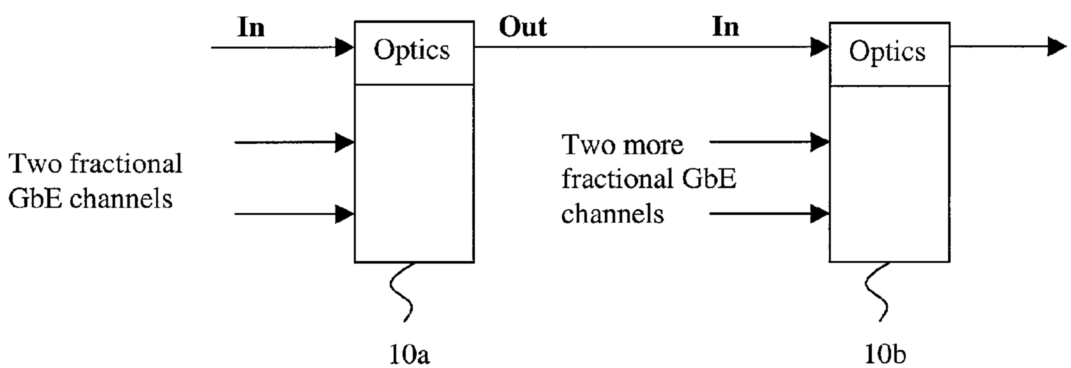
FIG. 4 is a block diagram of cascaded communications devices.

FIG. 4 is a block diagram of two cascaded communications devices 10. If each of first signals (e.g., the GbE signals) is only partially utilized (e.g., not enough data to fill the available bandwidth), then several of the communications devices 10 can be cascaded at a single location or at multiple locations around the communications network to completely fill up transmission frames in the second format (e.g., the SONET frame shown in FIG. 1). This allows the communications device 10 to be rate-adaptive accepting signals in the first format at varying utilization rates. There may be a lower limit on the bandwidth of the first signal depending on the application of the communications device 10. For example, the lowest bandwidth GbE signal that can be multiplexed into an OC-48 SONET frame is ~52 Mb/s. As shown in FIG. 4, the communications devices 10 are cascaded so that the optics output of a first communications device 10*a* is provided to the optics input of a second communications device 10*b*. The output of the first communications device 10*a* is multiplexed with the GbE signals input to second communications device 10*b*. Each of the GbE signals is associated with an automatically provisioned overhead byte as described above to enable delivery to the appropriate network node.

Alternatively, instead of cascading multiple communications devices 10, a communications device can be provided with more than two inputs to allow for combining partially utilized first signals. A single communications device 10 may include N inputs and receive N first signals, where the sum of the bandwidth for the N signals is equal to the bandwidth in the second format. For example, a single communications device 10 may receive four partially used GbE signals. These four signals are then automatically provisioned overhead bytes, multiplexed and processed as described above with reference to FIG. 2 to fill the 2.5 Gb/s rate of the SONET OC-48 transmission.

Figure 5:
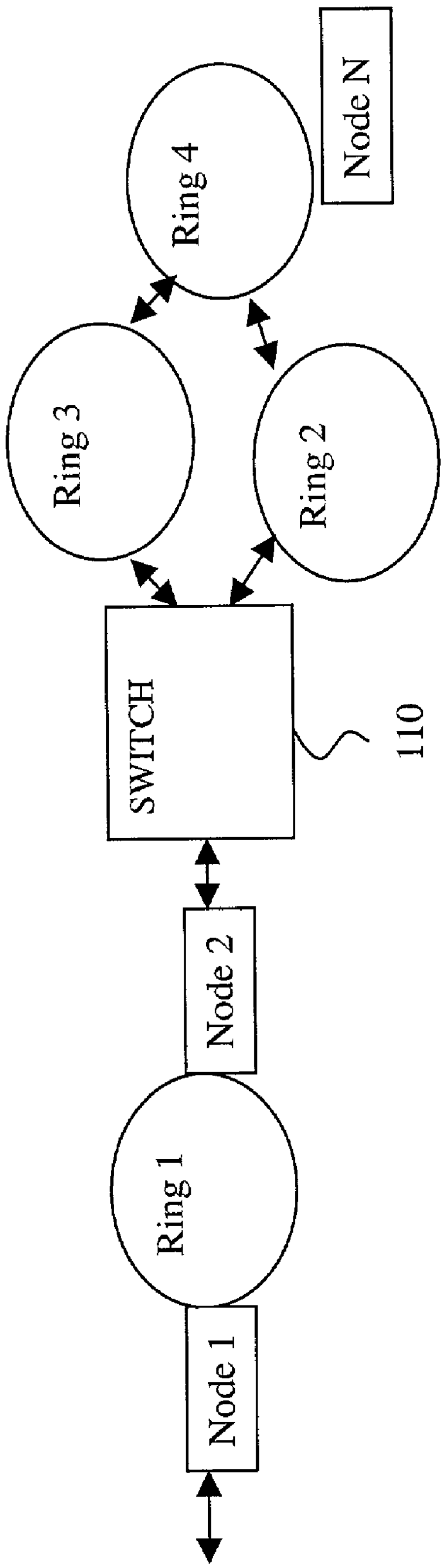
FIG. 5 depicts an exemplary communications network.

FIG. 5 is a block diagram of a communications network illustrating additional functionality of the communications device 10. As shown in FIG. 5, the communications network includes nodes (node 1, node 2 and node N) coupled by a number of rings (ring 1, ring 2, ring 3 and ring 4). Each node includes a communications device 10 as described above with reference to FIG. 2. In a first application, five fractional GbE signals originate at node 1 for delivery along the communications network. The five fractional GbE signals are mapped onto a single SONET OC-48 signal at node 1 as described above. For illustrative purposes, the bandwidth associated with the data that will be delivered at node 2 is ~200 Mb/s. Therefore, on a single OC-48 signal, 4 STS-1 frames are allocated from node 1 to node 2.

As described above, the processor 14 at node 1 automatically provisions the four STS-1 frames that have been allocated to node 2 to have the overhead byte (e.g., J1) provisioned to include the CLLI Code_192.1 THz(assume)_Address of Node 1_Address of Node2. The communications device 10 at node 1 will also automatically provision overhead bytes for other frames so that the destination address corresponds to their respective destinations.

Once the second signal (e.g., the SONET signal) is placed on ring 1 and reaches node 2, the processor 14 at node 2 recognizes the STS-1 frames allocated to node 2. The processor 14 at node 2 accesses the provisioned overhead bytes (e.g., J1) associated with the STS-1 frames and confirms that the provisioned overhead byte matches the path label for which node 2 has been provisioned. If the provisioned overhead byte matches the path label, then the data is provided from ring 1 to the recipient at node 2. Otherwise, a provisioned overhead byte mismatch alarm is raised and the data is not forward to the recipient of node 2. This prevents unintended data transfer and keeps separate networks separated even though they share the same wavelength on a ring.

The automatically provisioned overhead byte can also be used by other components along a communications network such as switch 110 shown in FIG. 5. In this example, first signals originating from node 1 are to be delivered at node N. The communications device at node 1 automatically provisions the overhead byte for the frames to be sent to node N to contain CLLI Code__192.1THz(assume)_Address of Node 1_Address of Node 2_Address of Node I (intermediate node)_Address of Node N. At node 2, the communications device directs the signals intended for node N to switch 110. The switch 110 may be implemented using existing electrical crossconnect switches. Switch 110 routes the signal from node 2 either through ring 2 or ring 3 to ring 4 and node N. As originally provisioned, the signal is to be distributed from node 1 to ring 1 to switch 110 to ring 2 to ring 4 to node N. If there is a failure in ring 2, then switch 110 can reroute the signals using ring 3, to reach ring 4 to node N. The switch 110 accesses the automatically provisioned overhead byte (e.g., J1) and determines that the signal needs to be terminated at node N and hence routes the signals accordingly. Thus, the switch 110 can use the automatically provisioned overhead byte to re-route signals in the event of network failures. In addition, the switch 110 may use the automatically provisioned overhead bytes to direct signals to multiple different recipients on ring 4 in a manner similar to that described above with reference to FIG. 3.

The automatic provisioning of the overhead byte has been described for use with two communications devices 10 such as that shown in FIG. 2. The communication device 10 may also be used for transmission to existing receivers (e.g., a SONET OC-48 receiver). In this scenario, the receiver would not check the provisioned overhead byte but would use conventional techniques to confirm proper delivery.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

What is claimed is:

1. A communications device for use in a communications network, the communications device comprising:

a plurality of interface ports, each of said interface ports receiving a first signal in a first format;

a processor coupled to said plurality of interface ports, said processor receiving said first signals, provisioning an overhead byte associated with one of said first signals to form a provisioned overhead byte and multiplexing said first signals to generate a multiplexed signal; and a framer coupled to said processor, said framer receiving said multiplexed signal and said provisioned overhead byte and placing said multiplexed signal and provisioned overhead byte in a second format to provide a second signal for transmission on the communications network, wherein said overhead byte can be utilized to determine whether a receiver should demultiplex said second signal to said first signals, and wherein:

during reception said framer receives said second signal and extracts said multiplexed signal and said provisioned overhead byte from said second signal; and during reception said processor receives said provisioned overhead byte and said multiplexed signal and compares said provisioned overhead byte to a path label associated with the communications device, said processor demultiplexing said multiplexed signal to form said first signals and directing one of said first signals to said interface port if said provisioned overhead byte matches said path label.

2. The communications device of claim 1 wherein said provisioned overhead byte is provisioned to include a destination address.

3. The communications device of claim 2 wherein said provisioned overhead byte is provisioned to include a transmission frequency.

4. The communications device of claim 3 wherein said provisioned overhead byte is provisioned to include a source address.

5. The communications device of claim 4 wherein said provisioned overhead byte is provisioned to include a common language location identifier.

6. The communications device of claim 1 wherein said processor provisions a plurality of overhead bytes, each provisioned overhead byte corresponding to one of said first signals.

7. The communications device of claim 1 wherein said first format is gigabit Ethernet.

8. The communications device of claim 7 wherein said second format is the SONET standard.

9. The communications device of claim 8 wherein said provisioned overhead byte is byte J1 in the SONET standard.

10. The communications device of claim 7 wherein said second format is the SDH standard.

11. The communications device of claim 10 wherein said provisioned overhead byte is byte J1 in the SDH standard.

12. A communications device for use in a communications network, the communications device comprising:

a framer for receiving a second signal in a second format from the communications network, said framer extracting a multiplexed signal and a provisioned overhead byte from said second signal;

a processor coupled to said framer, said processor receiving said provisioned overhead byte and said multiplexed signal and comparing said provisioned overhead byte to a path label associated with the communications device;

said processor demultiplexing said multiplexed signal to form a plurality of first signals in a first format if said provisioned overhead byte matches said path label; and an interface port coupled to said processor, said processor directing one of said first signals to said interface port if said provisioned overhead byte matches said path label.

13. The communications device of claim 12 wherein said provisioned overhead byte includes a destination address.

14. The communications device of claim 13 wherein said provisioned overhead byte includes a transmission frequency.

15. The communications device of claim 14 wherein said provisioned overhead byte includes a source address.

16. The communications device of claim 15 wherein said provisioned overhead byte includes a common language location identifier.

17. The communications device of claim 12 wherein said first format is gigabit Ethernet.

18. The communications device of claim 17 wherein said second format is the SONET standard.

19. The communications device of claim 18 wherein said provisioned overhead byte is byte J1 in the SONET standard.

20. The communications device of claim 17 wherein said second format is the SDH standard.

21. The communications device of claim 20 wherein said provisioned overhead byte is byte J1 in the SDH standard.

22. A method of transmitting information on a communications network, the method comprising:

receiving a plurality of first signals in a first format;

provisioning an overhead byte associated with one of said first signals to generate a provisioned overhead byte and multiplexing said first signals to generate a multiplexed signal;

placing said multiplexed signal and said provisioned overhead byte in a second format to provide a second signal for transmission on the communications network;

receiving said second signal from the communications network and extracting said multiplexed signal and provisioned overhead byte from said second signal;

comparing said provisioned overhead byte to a path label associated with a recipient;

demultiplexing said multiplexed signal to form a plurality of transmitted signals in said first format if said provisioned overhead byte matches said path label; and directing one of said transmitted signals to a recipient.

23. The method of claim 22 wherein said provisioning includes specifying a destination address.

24. The method of claim 23 wherein said provisioning includes specifying a transmission frequency.

25. The method of claim 24 wherein said provisioning includes specifying a source address.

26. The method of claim 25 wherein said provisioning includes specifying a common language location identifier.

27. The method of claim 22 wherein said provisioning includes provisioning a plurality of overhead bytes, each provisioned overhead byte corresponding to one of said first signals.

28. The method of claim 22 wherein said first format is gigabit Ethernet.

29. The method of claim 28 wherein said second format is SONET.

30. The method of claim 29 wherein said provisioned overhead byte is byte J1 in the SONET standard.

31. The method of claim 28 wherein said second format is the SDH standard.

32. The method of claim 31 wherein said provisioned overhead byte is byte J1 in the SDH standard.

33. A method for receiving information from a communications network, the method comprising:

receiving a second signal from the communications network and extracting said multiplexed signal and provisioned overhead byte from said second signal;

comparing said provisioned overhead byte to a path label associated with a recipient;

demultiplexing said multiplexed signal to form first signals in a first format if said provisioned overhead byte matches said path label; and directing one of said first signals to said recipient.

34. The method of claim 33 wherein said provisioned overhead byte includes a destination address.

35. The method of claim 34 wherein said provisioned overhead byte includes a transmission frequency.

36. The method of claim 35 wherein said provisioned overhead byte includes a source address.

37. The method of claim 36 wherein said provisioned overhead byte includes a common language location identifier.

38. The method of claim 33 wherein said first format is gigabit Ethernet.

39. The method of claim 38 wherein said second format is SONET.

40. The method of claim 39 wherein said provisioned overhead byte is byte J1 in the SONET standard.

41. The method of claim 38 wherein said second format is the SDH standard.

42. The method of claim 41 wherein said provisioned overhead byte is byte J1 in the SDH standard.

43. A communications device for use in a communications network, the communications device comprising:

a plurality of interface ports, each of said interface ports receiving a first signal in a first format;

a processor coupled to said plurality of interface parts, said processor receiving said first signals, provisioning an overhead byte associated with one of said first signals to form a provisioned overhead byte and multiplexing said first signals to generate a multiplexed signal; and a framer coupled to said processor, said framer receiving said multiplexed signal and said provisioned overhead byte and placing said multiplexed signal and provisioned overhead byte in a second format to provide a second signal for transmission on the communications network;

wherein said provisioned overhead byte is provisioned to include a destination address, said provisioned overhead byte being compared to a path label upon reception of one of said first signals.

* * * * *